United States Patent
Schreiner et al.

(10) Patent No.: US 6,881,960 B2
(45) Date of Patent: *Apr. 19, 2005

(54) THICK SCINTILLATION PLATE WITH INTERNAL LIGHT COLLIMATION

(75) Inventors: Robert S. Schreiner, Chagrin Falls, OH (US); George Mataraza, Euclid, OH (US); Csaba M. Rozsa, Brecksville, OH (US)

(73) Assignee: Saint-Gobain Industrial Ceramics, Inc., Worcester, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/395,325

(22) Filed: Mar. 24, 2003

(65) Prior Publication Data

US 2003/0183772 A1 Oct. 2, 2003

Related U.S. Application Data

(63) Continuation of application No. 09/517,492, filed on Mar. 2, 2000, now Pat. No. 6,563,121.
(60) Provisional application No. 60/123,959, filed on Mar. 12, 1999.

(51) Int. Cl.[7] ............................................. G01T 1/202
(52) U.S. Cl. .................................. 250/368; 250/370.11
(58) Field of Search ................................ 250/368, 367, 250/369, 370.11

(56) References Cited

U.S. PATENT DOCUMENTS

| | | | | |
|---|---|---|---|---|
| 4,700,074 A | | 10/1987 | Bosnjakovic | |
| 4,750,972 A | | 6/1988 | Casey et al. | |
| 4,831,263 A | * | 5/1989 | Yamashita | 250/368 |
| 4,945,241 A | | 7/1990 | Yamashita et al. | |
| 5,227,633 A | | 7/1993 | Ryuo et al. | |
| 5,229,613 A | | 7/1993 | Pandelisev et al. | |
| 5,393,891 A | | 2/1995 | Batt et al. | |
| 5,861,628 A | * | 1/1999 | Genna et al. | 250/368 |
| 5,874,738 A | | 2/1999 | Huth | |
| 6,563,121 B1 | * | 5/2003 | Schreiner et al. | 250/368 |

FOREIGN PATENT DOCUMENTS

GB      2034148      5/1980

* cited by examiner

*Primary Examiner*—Scott J. Sugarman
*Assistant Examiner*—Richard Hanig
(74) *Attorney, Agent, or Firm*—Renner, Otto, Boisselle & Sklar, LLP

(57) ABSTRACT

A gamma camera plate incorporates scintillation crystal which is sufficiently thick to effectively capture high energy radiation. The crystal is provided on its light output side with an array of light path-modifying partitions which extend partly through its thickness. These partitions define individual light collimating cells which reduce the light spreading which would otherwise prevent effective use of the plate for low energy radiation.

21 Claims, 2 Drawing Sheets

THICK SCINTILLATION PLATE WITH INTERNAL LIGHT COLLIMATION

CROSS-REFERENCE TO RELATED APPLICATIONS

This application is a continuation of Ser. No. 09/517,492, filed Mar. 2, 2000, now U.S. Pat. No. 6,563,121, which claims the benefit of the provisional application No. 60/123,959 filed Mar. 12, 1999.

FIELD OF THE INVENTION

The invention relates generally to medical imaging devices and more particularly to such devices which use energy conversion devices to obtain an electrical signal in response to gamma radiation.

BACKGROUND

Medical imaging is accomplished by inducing a patient with a radiopharmaceutical substance by injection swallowing, inhalation, or other appropriate means. The radioactive isotope of the radiopharmaceutical selectively migrates to the target area tissue to be examined and emits gamma radiation from it. Reference herein to "radiation" is to any ionizing radiation, but typically gamma radiation. The radiation can be sensed and used to generate a reconstructed image of features of the target area tissue to provide diagnostic information for appropriate treatment.

The sensing of radiation from target tissue area is typically accomplished by means of a gamma camera. Such a camera features a detector head including a round or rectangular camera plate optically coupled to a corresponding two-dimensional array of position-sensitive photosensors, typically photomulitplier tubes. The array of photosensors may have a view of the camera plate which is about 30 (centimeters) or more in its major dimension. Detector heads weighing hundreds of pounds are used to make two-dimensional images, sometimes in a stationary mode and sometimes in a scanning mode. They can also be used to make three dimensional images by taking a plurality of views of the same target from different angles and using computer logic image reconstruction techniques.

A so called "gamma camera plate" is a large area device for converting radiation to light and is most commonly an assembly of a scintillation crystal slab, such as sodium iodide doped with thallium for activation, which is hermetically sealed in a housing. The housing is made up of a shallow aluminum pan "back cap" covered with a glass optical window bonded to the back cap about its perimeter. An optical interface is provided between the crystal and the window to improve the coupling. Such an assembly is described, for example, in U.S. Pat. No. 5,874,738 issued Feb. 23, 1999 to Scott R. Huth and assigned to the same assignee as is the present invention.

In operation, radiation from the target enters the crystal from the back cap radiation entrance side of the camera plate. The radiation interacts with the crystal to result in light scintillation inside it. The light passes out of the plate through the optical window and into an array of photomultipliers which are coupled to its outside surface to convert the light to electrical signals. The electrical signals are fed to a digital processor for the construction of image information in a graphic form. The processor software has the capability for accounting to some extent for spreading of the light inside the crystal between the point of its creation and its exit from the window into the photomultipliers. The spreading results in some loss of reconstructed image resolution and is undesirable in that respect, but it is at the same time also necessary to some extent for determination of position information by comparing the signal response of several nearby photomultiplier tubes to the same scintillation event.

Medical imaging may variously require low or high energy radiation, depending on the type and thickness of tissue being examined. Common low energies for medical imaging are those up to 140 keV (thousand electron volts), such as 80 keV available from the isotope thallium-201 and 140 keV available from the isotope technetium-99$^m$. A common high energy is, for example, 511 keV, such as is available from the isotope fluorine-18. The radiation's mean depth of interaction with the crystal is close to the radiation entrance side for low energies, but deeper for the higher energies. This presents a serious tradeoff problem with regard to the choice of thickness for the crystal. A crystal which is the optimum thickness for low energy radiation is too thin to effectively capture high energy radiation. On the other hand, a crystal with an optimum thickness for high energy radiation suffers from excessive light spreading with low energy radiation, thereby reducing the image resolution. Therefore, in order for an imaging system to be usable with good resolution for both low and high energy radiation, it would be necessary to change the gamma camera plate. However, this is a costly component which is also closely matched to the associated electrical hardware and software and therefore not easily exchanged for one with different characteristics. There is a need, therefore, for a gamma camera plate which can be satisfactorily used with both low and high energy radiation.

SUMMARY OF THE INVENTION

In accordance with the present invention, a scintillation device, such as a gamma camera plate, incorporates a novel crystal feature which permits the achievement of satisfactory resolution for both low and high energy radiation. The crystal is sufficiently thick to effectively capture the high energy radiation, but is provided on its light output side with an array of light path-modifying partitions which extend partly through the thickness of the crystal. These partitions define individual light collimating cells. These cells reduce the light spreading which would otherwise prevent effective use of the plate for low energy radiation. At the same time, the collimating cells do not significantly interfere with the use of the camera plate for high energy rays and may even improve it. The term "collimate" herein refers to modifying light in the crystal to control its lateral spreading as it travels from a scintillation event location in the crystal bulk to the light output face.

The light collimating partitions may take various different forms. They may be slots cut into the surface of the crystal partially through the thickness by physical or chemical means. They may also be crystal grain boundaries or other optical discontinuities introduced mechanically, such as by ion bombardment, or otherwise. The geometry of the cells may take various forms, depending on the desired collimation characteristics and the input aperture size of the photosensors to which they are directing the light. Typically, they would be columnar segments with their central axis perpendicular to the faces of the crystal and having a square cross-section.

DESCRIPTION OF THE PREFERRED EMBODIMENTS

Figure 1:
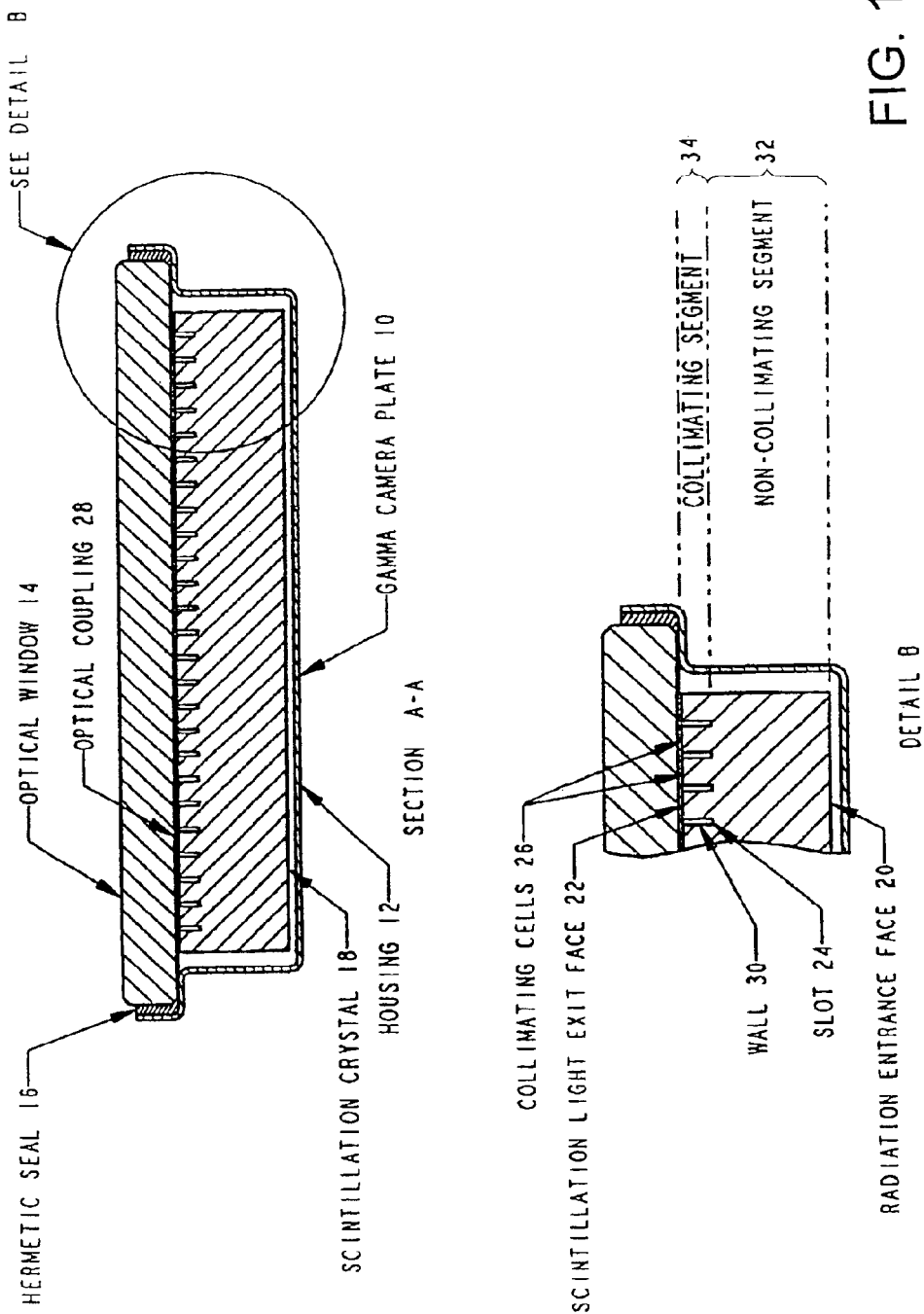
FIG. 1 is a schematic, front, sectional view of a gamma camera plate in accordance with a preferred embodiment of the invention containing a thick scintillation crystal.
Figure 2:
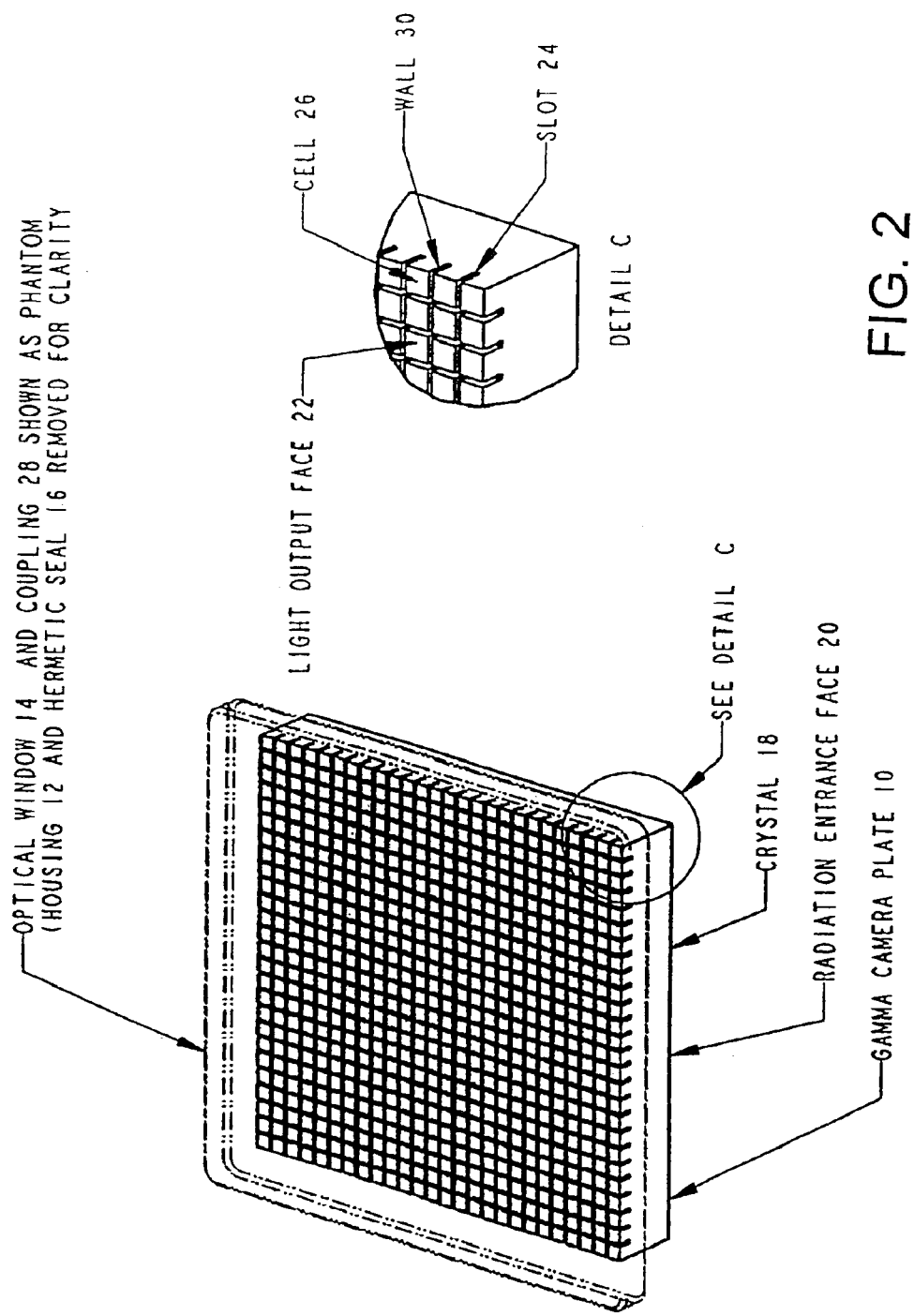
FIG. 2 is an elevated perspective view of the crystal of the gamma camera plate of FIG. 1 with the housing removed and outlined in phantom lines for greater clarity.

A preferred embodiment of the present invention is the novel gamma camera plate 10 shown in FIG. 1. The camera plate 10 includes a thin back cap 12 of aluminum to which a glass optical window 14 is assembled with an epoxy hermetic seal 16 to form a sealed housing. Inside the housing is a scintillation crystal 18 about 1.9 cm thick of thallium-activated NaI (sodium iodide) having a radiation entrance face 20 and a light output face 22. The light output face 22 is coupled to the optical window 14 by means of a transparent polymer optical coupling 28.

An orthogonal set of equally-spaced, narrow slots 24 about 1 mm wide spaced from each other a distance of about 6 mm extend about 10 mm from the light output face 22 into the scintillation crystal 18 toward the radiation entrance face 20 to form an orthogonal array of closely-spaced collimating cells 26 which have square cross-sections in a plane parallel to the light output face 22 and have four walls 30 defined by the slots 24.

The walls 30 provide a collimating function by refracting, scattering, reflecting, or even absorbing scintillation light incident on them from the inside of the cell to modify the lateral component of its path which is parallel to the output face 20 and to thereby control the passage of light to an adjacent cell 26, while preserving at least a portion of it to be passed to the input aperture of a phototube, not shown, most closely associated with the cell 26. The non-collimating portion 32 of the crystal 18 through which the slots 24 do not extend has a thickness which is suited for low energy radiation, typically up to 140 keV. The scintillation light from the low energy radiation entering it from the radiation entrance face 20 is permitted to spread as it would normally in a crystal plate of this thickness. When the light reaches the collimating portion 34 of the crystal 18, however, it can no longer spread freely and is channeled to the appropriate most closely-associated photomultiplier tube coupled to the light output face 22 via the window 14. High energy radiation, such as that with 511 keV, penetrates more deeply into the crystal 18 and also results in a more intense scintillation light than does the lower energy radiation. The added thickness provided by the collimating portion 34 is needed for the high energy radiation to efficiently interact with the crystal 18. The resolution of the reconstructed image from signals derived from the camera plate 10 may be improved even over that which would be available with a crystal of the same thickness used with only high energy radiation but without the collimating feature, since scintillation light which is directed back toward the radiation input face 20 and reflected from there to the output face 22 also decreases spreading when it reaches the cells 26 of the collimating segment 34.

In order to retain the performance of the camera plate 10 for low energy radiation, it is best to keep the degree of light spreading close to what it is in thin low energy plates of the present type without collimating cells. For this, the bulk of the non-collimating portion 32 of the crystal 18 is preferably left continuous to allow the light generated in the scintillator to spread in the usual way until it reaches the collimating portion 34, at which point the collimating cells 26 act to channel the light to the photomultiplier tubes by collecting it before it can spread further. With deeper slots 24, the dropping off of any light spreading with distance from the point of interaction of the radiation with the crystal 18 becomes more pronounced. However, if this light spread drop-off becomes too pronounced, then the photomultiplier aperture diameters may need to be reduced for optimum performance. It is noted that the limit is where the light spread drop-off is so pronounced that most of the light of a scintillation event is collected by a single photomultiplier tube. In that case no imaging is possible because the position resolution is the photomultiplier aperture diameter. Conversely, with shallower slots the light spread drop-off is less pronounced with distance from the point of interaction of the radiation with the scintillator. Thus the depth and/or spacing of the grooves may be able to serve as a control parameter for tuning the desired degree of light spreading in the crystal 18 for optimizing resolution. Furthermore, the walls of the grooves may be sloped, rather than parallel to each other.

For higher energies of radiation, the average penetration into the crystal by the radiation is deeper and the amount of light produced is proportionately higher. The light which is emitted back towards the radiation entrance face 20, which can be up to $2\pi$ solid angle, into the continuous part of the crystal is spread much as it is in the standard, thinner gamma camera plate scintillator plates for low energy radiation. The light which travels toward the slots 24 or photomultiplier tubes is refracted, reflected, or scattered to be preferentially collected locally by the associated photomultiplier tube.

General Considerations

The invention is useful not only for large camera plates of the type for gamma cameras which can provide an image of the adult human torso, but also for smaller devices which can provide image information for infants, small animals, or an appendage. An example of such a smaller medical imaging device is described in provisional U.S. application Ser. No. 60/107,375 filed Nov. 6, 1998 entitled "Compact Medical Imager" and having a common assignee. Moreover, the invention is not limited to the use of sodium iodide or other metal halide scintillation crystals and may be useful for virtually any scintillation member to reduce light spread in it where that is a problem. Candidates for optical scintillation materials might be, for example, organic scintillators, cadmium tungstate, cesium iodide, bismuth germinate (BGO), and others. For scintillation materials which are not hygroscopic and which do not for some other reason require protection inside a hermetically sealed housing as does NaI, the housing may, of course, be eliminated. Thus the term "plate" of "scintillation plate" or "camera plate" is intended to refer to a scintillation body of any size or geometry and whether or not enclosed in a protective housing.

While in the embodiment described above the scintillation crystal was provided with grooves to form walls which act as light refracting, scattering, or reflecting interfaces, the invention may be practiced with various other partition structures which provide collimation of the light. Reflection and scattering would be expected to provide better efficiency, but even some absorption may bring an advantage in terms of resolution under some circumstances, since it eliminates reflections back to the radiation input face which might then travel to another cell before entering a photo-mulitplier tube. The collimating cells may be defined by any partition which has the effect of modifying the lateral component of the path of the light, such as by refracting, scattering, reflecting, or even absorbing it.

The cells may be any suitable geometry which improves the performance of the scintillating body. They should generally be in a regular array and of like dimensions, but if substantially smaller than the input apertures of the photosensors coupled to them, could be arranged even randomly, so long as they are closely spaced to each other. Of particular interest would be cells with a polygonal cross-section, such as triangular, square, rectangular, etc., since these may be readily machined into the body by a series of straight cuts. Cells with a round cross-section may be more difficult to produce mechanically. Possible machining techniques for scintillation crystals include sawing, milling, laser ablation, high pressure jet erosion, electrical discharge machining (EDM), and others.

Where the cells are defined by slots or grooves, the cell walls in the grooves may be painted or filled with a reflecting material to improve their collimating efficiency. It may also be advantageous to texture the surface of the walls to provide the desired influence on the light. The texturing could be done, for example, mechanically by abrasion or chemically with a solvent.

It is also contemplated that the radiation entrance face of the scintillation crystal may be provided with a reflecting material on its surface or with surface features for reflecting or diffusing light to provide a desired Light spread drop-off characteristic in the crystal. For example, the image generated from the scintillation output of a camera plate may sometimes contain an unwanted spurious pattern, sometimes referred to as an "artifact" resulting from the particular electronics or software algorithms of the apparatus m which the camera plate is being used. They may be attributable to such parameters as linearity, uniformity, phantoms, hot spots, and flood images. It may be possible to selectively vary the partition depths or other partition paramters to modify the output so that the spurious pattern is diminished or eliminated.

The depth to which the light path-modifying partitions extend effects the light spread drop-off and can be chosen to provide the desired characteristics for the particular equipment in which it is being used. Those skilled in the art of such equipment are capable of taking such a parameter into account.

The cross-sectional size of the collimating cells in a plane parallel to the radiation entrance face of the scintillator plate may have a significant influence on the reconstructed image resolution which is obtainable. For a given system, the optimum size and geometry may to some extent dependent upon the type and geometry of the photosensors which are coupled to the scintillator to convert the light to an electrical signal. These photosensors may be photodiodes, photomultipliers, or some other type of conversion device. Typically they are photomultipliers, since these are presently much more sensitive than are photodiodes. If the size of the cell is much smaller, e.g. one-tenth the size of the photomultiplier tube aperture diameter, then it may not be necessary for the cross-sectional geometry of the cell to match that of the input aperture of the photomultiplier tube. This is because the cells would then be acting in a symmetrical manner as a mechanism for re-directing the light rays. If the cell cross-section size is appreciably large, on the order of that of the photomultiplier input aperture, e.g. twice the size, then it becomes necessary to consider not only the geometry of the cell, but also its placement relative to the photomultiplier tube because the redirected light rays can be quite biased in direction. A non-symmetrical spreading of the scintillation light may lead to image artifacts. This would be most likely to occur with large-scale granularity of the cell structure. However, it may be possible to cancel such artifacts by manipulation of digital image information. If the size of the cells is smaller than the input aperture of the photomultipliers, the positions of the cells relative to the photomultiplier input aperture and the cell geometry can also be an important factor in this regard.

What is claimed is:

1. A scintillation device, comprising:
   a scintillator body having a radiation entrance face, a light output face, and a thickness therebetween; and
   a plurality of light path-modifying partitions extending from the light output face into the thickness of the scintillator body a first distance which is less than the thickness;
   wherein the partitions have parallel sides extending perpendicular to the light output face and to a depth substantially less than the one half the thickness of the scintillator body;
   wherein the partitions are grooves which form an array of cells with walls; and
   wherein no such grooves are provided on the radiation entrance face of the scintillator body.

2. The device according to claim 1 wherein the scintillator body is a crystal.

3. The device according to claim 2 wherein the crystal is an activated metal halide salt.

4. The device according to claim 3 wherein the crystal is sodium iodide.

5. The device according to claim 4 comprising:
   a back cap having a well in which the crystal is disposed;
   an optical window covering the well of the back cap, and
   an hermetic sealing material between the window and the back cap.

6. The device according to claim 5 comprising an optical coupling material between the window and the crystal.

7. The device according to claim 6 wherein the resilient coupling material is a polymer.

8. The device according to claim 4 wherein the crystal is sodium iodide activated with thallium.

9. The device according to claim 1 wherein the grooves have a depth which is selectively varied.

10. The device according to claim 1 wherein the grooves have at least one light-affecting parameter which is selectively varied in order to counteract a spurious image pattern associated with an apparatus in which the device is intended to be used.

11. The device according to claim 1 wherein the walls of the cells are treated to modify their light interaction characteristics.

12. The device according to claim 11 wherein the treatment of the walls is the application of a reflective material to them.

13. The device according to claim 12 wherein the reflective material incorporates a white pigment.

14. The device according to claim 13 wherein the pigment is titanium dioxide.

15. The device of claim 1, wherein the entrance face of the scintillator body is provided with reflective material or with surface features for reflecting light back into the scintillator body.

16. A scintillation device useful with both high energy and low energy radiation, comprising a scintillator body having a radiation entrance face, a light output face, a collimating portion adjacent the light output face and a non-collimating portion between the collimating portion and the radiation entrance face, whereby the scintillator body can be made sufficiently thick for effective use with high energy radiation while permitting emitting effective use with low energy radiation.

17. The device of claim 16, wherein the thickness of the collimating portion is about 5% of the overall thickness of the scintillator body.

18. The device of claim 16 wherein the scintillator body is sufficiently thick to capture high energy radiation on the order of 511 keV.

19. The device of claim 18 wherein the non-collimating portion has a thickness selected for capturing low energy radiation up to 140 keV.

20. The device of claim 16, wherein the entrance face of the scintillator body is provided with reflective material or with surface features for reflecting light back into the scintillator body.

21. A scintillation device useful with both high energy and low energy radiation, comprising a scintillator body having a radiation entrance face, a light output face, a collimating portion adjacent the light output face and a non-collimating portion between the collimating portion and the radiation entrance face, whereby the scintillator body can be made sufficiently thick for effective use with high energy radiation while permitting emitting effective use with low energy radiation, wherein the relative thicknesses of the collimating portion and non-collimating portions are determined to provide a desired light spread drop-off.

* * * * *

UNITED STATES PATENT AND TRADEMARK OFFICE
CERTIFICATE OF CORRECTION

PATENT NO.    : 6,881,960 B2
DATED         : April 19, 2005
INVENTOR(S)   : Schreiner et al.

It is certified that error appears in the above-identified patent and that said Letters Patent is hereby corrected as shown below:

Column 6,
Line 66, delete the word "emitting".

Column 8,
Line 8, delete the word "emitting".

Signed and Sealed this

Twenty-third Day of August, 2005

JON W. DUDAS
*Director of the United States Patent and Trademark Office*